(12) United States Patent
Wang

(10) Patent No.: US 9,341,276 B2
(45) Date of Patent: May 17, 2016

(54) VALVE ASSEMBLY

(71) Applicant: EMERSON PROCESS MANAGEMENT REGULATOR TECHNOLOGIES, INC., McKinney, TX (US)

(72) Inventor: Le Wang, Chengdu (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 1 day.

(21) Appl. No.: 13/947,987

(22) Filed: Jul. 22, 2013

(65) Prior Publication Data
US 2014/0034154 A1    Feb. 6, 2014

(30) Foreign Application Priority Data
Jul. 20, 2012    (CN) .......................... 2012 1 0260440

(51) Int. Cl.
*F16K 31/12*    (2006.01)
*F16K 17/10*    (2006.01)
*G05D 16/16*    (2006.01)

(52) U.S. Cl.
CPC ................ *F16K 17/10* (2013.01); *G05D 16/16* (2013.01); *Y10T 137/7762* (2015.04)

(58) Field of Classification Search
CPC .. F16K 17/10; G05D 16/16; Y10T 137/7762; Y10T 137/7808
USPC .............. 137/488, 489.5, 492, 492.5, 505.13, 137/505.15, 505.21, 505.27, 505.29, 505.33
See application file for complete search history.

(56) References Cited

U.S. PATENT DOCUMENTS 17,317 A * 5/1857 Cornelius ................. 137/505.13
1,032,052 A * 7/1912 Evans ........................... 137/463
(Continued)

FOREIGN PATENT DOCUMENTS

CN            2683966 Y      3/2005
CN          201180829 Y      1/2009
(Continued)

OTHER PUBLICATIONS

Machine Translation of CN2683966Y from EPO website taked on Oct. 16, 2014.*
International Search Report from International Application No. PCT/CN/2013/077732 dated Sep. 26, 2013.
Written Opinion from International Application No. PCT/CN2013/077732 dated Sep. 26, 2013.
Second Office Action issued in related Chinese Patent Application No. 201210260440.1 dated May 20, 2014.
First Office Action issued in related Chinese Patent Application No. 201210260440.1 dated Sep. 4, 2013.

*Primary Examiner* — Jessica Cahill
(74) *Attorney, Agent, or Firm* — Marshall, Gerstein & Borun LLP

(57) ABSTRACT

A valve assembly including a valve body having a first pressure chamber and a second pressure chamber, the pressure of the first pressure chamber being lower than that of the second pressure chamber. The pressure of the second pressure chamber is discharged to the first pressure chamber in response to the change of the pressure of the first pressure chamber. A blocking device is arranged between the first pressure chamber and the second pressure chamber. A valve stem is arranged in the valve body with one end movably contacting the blocking device. A diaphragm is connected to the valve stem and is arranged adjacent to or above the first pressure chamber. When the pressure of the first pressure chamber is changed, the diaphragm forces the valve stem to move by sensing the pressure change of the first pressure chamber.

13 Claims, 14 Drawing Sheets

(56) References Cited

U.S. PATENT DOCUMENTS

| | | | |
|---|---|---|---|
| 2,720,887 A * | 10/1955 | Safford | 137/116.5 |
| 3,982,559 A * | 9/1976 | Ochs | 137/455 |
| 4,860,782 A | 8/1989 | Fujiwara et al. | |
| 4,966,183 A * | 10/1990 | Williamson, Jr. | 137/116.5 |
| 2004/0099312 A1 * | 5/2004 | Boyer | 137/489.5 |
| 2007/0284004 A1 * | 12/2007 | Ungerecht | G05D 16/0655 137/505.25 |
| 2012/0018658 A1 * | 1/2012 | Santos et al. | 251/321 |
| 2012/0227838 A1 * | 9/2012 | Ungerecht et al. | 137/528 |

FOREIGN PATENT DOCUMENTS

| | | |
|---|---|---|
| CN | 102777669 A | 11/2012 |
| CN | 202852154 U | 4/2013 |
| DE | 4106474 A1 | 9/1992 |
| JP | 2004157591 A | 6/2004 |

* cited by examiner

VALVE ASSEMBLY

FIELD OF THE DISCLOSURE

The present disclosure relates to a pressure adjusting device, and more particularly to a quick releasing assembly and a valve assembly comprising the pressure adjusting device.

BACKGROUND

The directing valve is also called as director or pilot valve. The directing valve is generally used to control the operation of a pressure adjusting valve (a pressure adjusting device).

FIG. 1 shows a typical pressure adjusting valve assembly 01 comprising a main valve 02, a directing valve 03 and an actuator 04. Specifically, the main valve 02 is connected into a main fluid line 012. The valve body of the main valve 02 includes an inlet chamber 05 coupled to a fluid source (for example, a gas supply station) by the main fluid line 012 and an outlet chamber 06 coupled to a fluid user (for example, a gas user) by the main fluid line 012. As is well known, the connection and disconnection between the inlet chamber 05 and the outlet chamber 06 may be achieved by a valve seat and a valve plug cooperating with the valve seat. The valve plug is forced to move between a position engaged with the valve seat and a position away from the valve seat by the valve stem coupled to the valve plug. The valve stem of the main valve 02 is connected to an actuating member of the actuator 04 (for example, the actuating member may be a diaphragm or a piston). The actuating member divides the controlling chamber of the actuator 04 into a chamber 07, which is in communication with a first pressure chamber 09 of the directing valve 03, and a chamber 08, which is in communication with a second pressure chamber 011 of the directing valve 03. The first pressure chamber 09 senses the change of the pressure of the outlet chamber 06 (or outlet pressure) of the main valve 02 so as to control the opening degree between the second pressure chamber 011 and a third pressure chamber 010 (for example, the third pressure chamber 010 is in fluid communication with the inlet chamber 05 of the main valve 02), and then the change of the opening degree may cause the change of the pressure of the second pressure chamber 011, thus the pressure exerted on the two ends of the actuating member of the actuator 04 is changed and the displacement of the actuating member may cause the displacement of the valve plug of the main valve 02. In this way, the pressure of the outlet chamber 06 of the main valve 02 is self-adjusted by the directing valve 03 and the actuator 04.

FIG. 2a shows the specific configuration of a known directing valve 03. The directing valve 03 comprises a quick releasing hole 032 and a valve port 033 arranged between a valve port gasket 031 and the valve seat. The valve port gasket 031 is coupled to a diaphragm 034 by a supporting plate 035 and a fastener 036. As shown in the drawings, when the pressure in the first pressure chamber 09 on one side of the diaphragm 034 is decreased, the diaphragm 034 moves upwards so as to force the valve port gasket 031 to move upwards, thus the opening degree between the valve port gasket 031 and the valve port 033 is increased. Since the pressure of the third pressure chamber 010 is generally higher than that of the second pressure chamber 011, the pressure in the third pressure chamber 010 is supplied to the second pressure chamber 011. As a result, the pressure across the actuating member of the actuator 04 is changed, and the actuating member forces the valve plug of the main valve 02 to move so that the opening degree of the main valve 02 is increased, thus the outlet pressure of the main valve is increased. In contrast, when the pressure in the first pressure chamber 09 on one side of the diaphragm 034 is increased, the diaphragm 034 moves downwards so as to force the valve port gasket 031 to move downwards, thus the opening degree between the valve port gasket 031 and the valve port 033 is reduced, and the pressure in the second pressure chamber 011 is decreased. As a result, the pressure across the actuating member of the actuator 04 is changed, and the actuating member forces the valve plug of the main valve 02 to move so that the opening degree of the main valve 02 is reduced, thus the outlet pressure of the main valve is decreased. If the pressure in the first pressure chamber 09 is increased gradually, the valve port gasket 031 abuts against the valve port 033, that is to say, the valve port 033 is closed. Then, the quick releasing hole 032 is opened, and the pressure in the second pressure chamber 011 is quickly discharged to the first pressure chamber 09 through the quick releasing hole 032 since the pressure of the second pressure chamber 011 is higher than that of the first pressure chamber 09.

FIG. 2b shows the specific configuration of another known directing valve 03'. The directing valve 03' comprises a quick releasing hole 032' and a valve port 033' arranged between a valve port gasket 031' and the valve seat. The valve port gasket 031' is coupled to a diaphragm 034' by a supporting plate 035' and a fastener 036'. As shown in the drawings, when the pressure in the first pressure chamber 09' on one side of the diaphragm 034' is decreased, the diaphragm 034' moves downwards so as to force the valve port gasket 031' to move downwards, thus the opening degree between the valve port gasket 031' and the valve port 033' is increased. Since the pressure of the inlet pressure chamber 010' is higher than that of the second pressure chamber 011', the pressure in the third pressure chamber 010' is supplied to the second pressure chamber 011'. As a result, the pressure across the actuating member of the actuator 04 is changed, and the actuating member forces the valve plug of the main valve 02 to move so that the opening degree of the main valve 02 is increased, thus the outlet pressure of the main valve is increased. In contrast, when the pressure in the first pressure chamber 09' on one side of the diaphragm 034' is increased, the diaphragm 034' moves upwards so as to force the valve port gasket 031' to move upwards, thus the opening degree between the valve port gasket 031' and the valve port 033' is reduced, and the pressure in the second pressure chamber 011' is decreased. As a result, the pressure across the actuating member of the actuator 04 is changed, and the actuating member forces the valve plug of the main valve 02 to move so that the opening degree of the main valve 02 is reduced, thus the outlet pressure of the main valve is decreased. If the pressure in the first pressure chamber 09' is increased gradually, the valve port gasket 031' abuts against the valve port 033', that is to say, the valve port 033' is closed. Then, the quick releasing hole 032' is opened, and the pressure in the second pressure chamber 011' is quickly discharged to the first pressure chamber 09' through the quick releasing hole 032' since the pressure of the second pressure chamber 011' is higher than that of the first pressure chamber 09'.

However, the directing valves as shown in FIGS. 2a and 2b have some problems. That is, the valve port gasket 031 and 031' need to be coupled to the diaphragm 034, 034', thus additional elements 035, 036 are needed, thereby increasing the complexity of the installation and the replacement of the elements. In addition, in the known directing valves, the quick releasing hole is arranged on one side away from the valve port gasket.

SUMMARY

In one embodiment, the present invention provides a valve assembly, comprising: a valve body having a first pressure chamber and a second pressure chamber, wherein the pressure of the first pressure chamber is lower than that of the second pressure chamber, and the pressure of the second pressure chamber is discharged to the first pressure chamber in response to the change of the pressure of the first pressure chamber; a blocking device arranged between the first pressure chamber and the second pressure chamber; a valve stem arranged in the valve body, one end of the valve stem movably contacting the blocking device; and a diaphragm connected to the valve stem and arranged adjacent to or above the first pressure chamber; wherein when the pressure of the first pressure chamber is changes, the diaphragm forces the valve stem to move by sensing the change of the pressure of the first pressure chamber.

According to one example, the first pressure chamber comprises an inner chamber arranged on the valve stem, and the valve stem is provided with a connecting hole at the one end that contacts the blocking device, the connecting hole being for communicating the inner chamber of the valve stem with the second pressure chamber.

According to one example, the connecting hole is arranged on one side of the one end of the valve stem that contacts the blocking device, wherein when the valve stem pushes the blocking device, the connecting hole is blocked by the blocking device and the first pressure chamber is shut off from the second pressure chamber, and wherein when the valve stem is disengaged from the blocking device, the first pressure chamber is in communication with the second pressure chamber through the connecting hole.

According to one example, the valve body is further provided with a valve port for receiving the valve stem, and the second pressure chamber is arranged on the valve port and has a side opening for coupling the second pressure chamber to the external pressure.

According to one example, the first pressure chamber further comprises a third pressure chamber adjacent to the other end of the valve stem and in communication with the inner chamber of the valve stem, and the diaphragm is arranged above the third pressure chamber and forces the valve stem to move by sensing the change of the pressure of the third pressure chamber.

According to one example, the valve assembly further comprises a fourth pressure chamber connected to the second pressure chamber by the blocking device and having a pressure higher than that of the second pressure chamber, wherein when the valve stem pushes the blocking device, the fourth pressure chamber is in communication with the second pressure chamber, and when the valve stem is disengaged from the blocking device, the fourth pressure chamber is shut off from the second pressure chamber.

According to one example, the fourth pressure chamber is further provided with a biasing member for restoring the blocking device.

According to one example, when the valve stem pushes the blocking device, the first pressure chamber is in communication with the second pressure chamber, and when the valve stem is disengaged from the blocking device, the first pressure chamber is shut off from the second pressure chamber.

According to one example, the diaphragm is coupled to the valve stem by an upper plate and a lower plate arranged on the valve stem and a screw nut.

The valve assembly according to the present invention can obtain one or more following advantages.

Firstly, the connecting hole is arranged in the position adjacent to the first opening, thereby providing more flexibility to the design of the valve assembly.

Secondly, it is unnecessary to couple the valve port gasket to the diaphragm, thereby reducing the complexity of the installation.

Additionally, the additional element for coupling the valve port gasket to the diaphragm is not needed.

Additionally, since the valve port gasket is an independent element, the replacement thereof is simple and the cost is lower.

BRIEF DESCRIPTION OF THE DRAWINGS

The embodiments of the present invention may be better understood with reference to the following drawings. The members in the drawings are not drawn proportionally.

In the above drawings, similar reference numerals may be understood to denote the same, similar or corresponding features or functions.

DETAILED DESCRIPTION OF THE PREFERRED EMBODIMENTS

Figure 1:
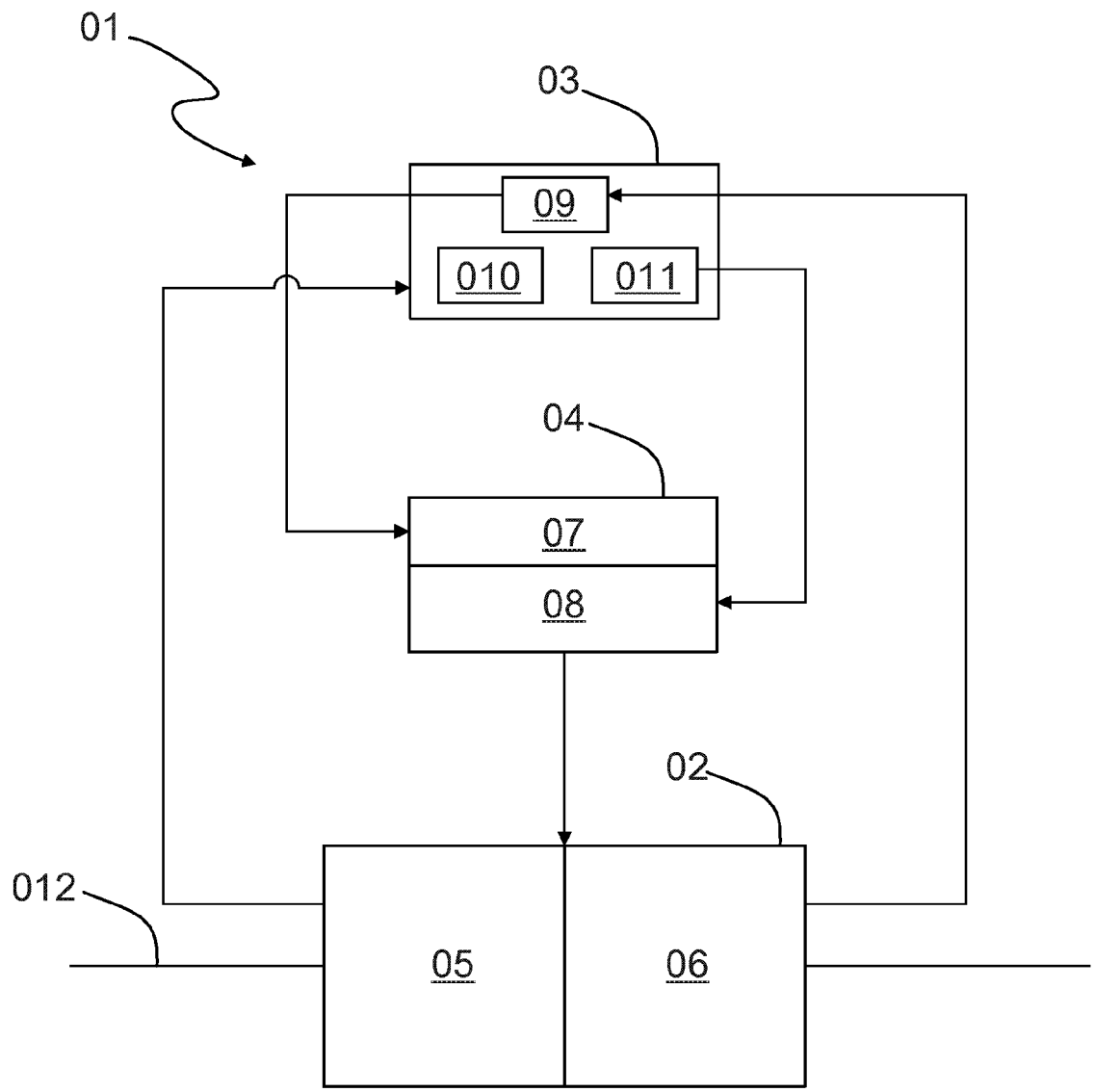
FIG. 1 is a block diagram of a pressure adjusting valve assembly.
Figure 2A:
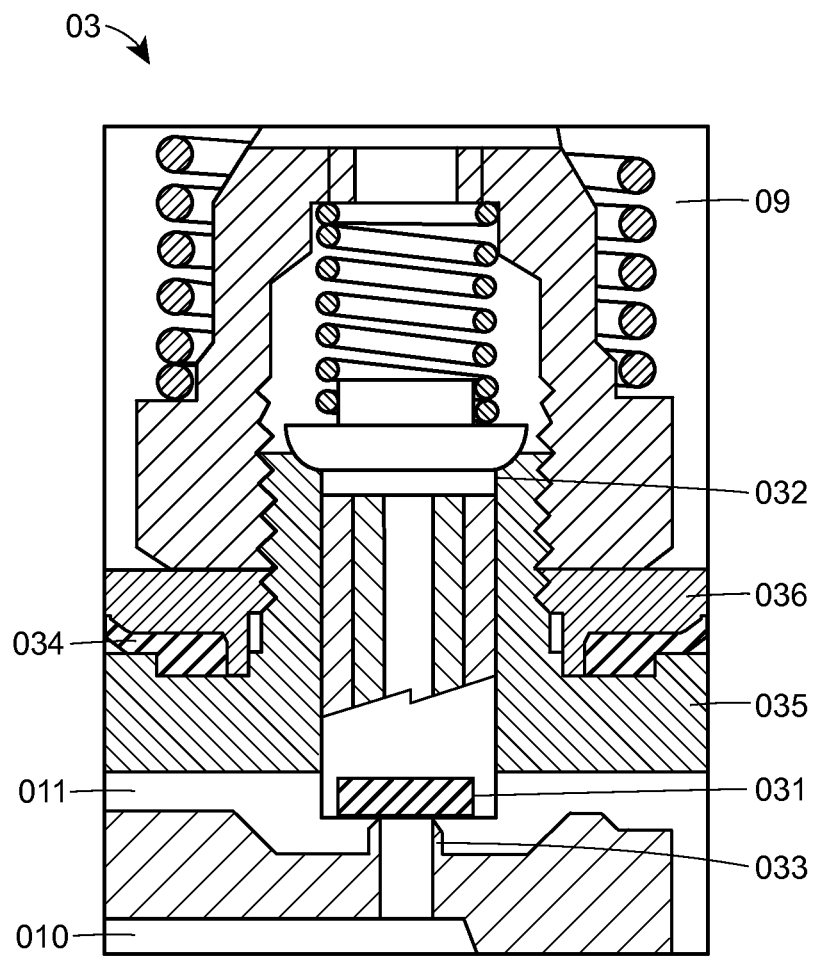
FIG. 2a is a partial sectional view of a known directing valve.
Figure 2B:
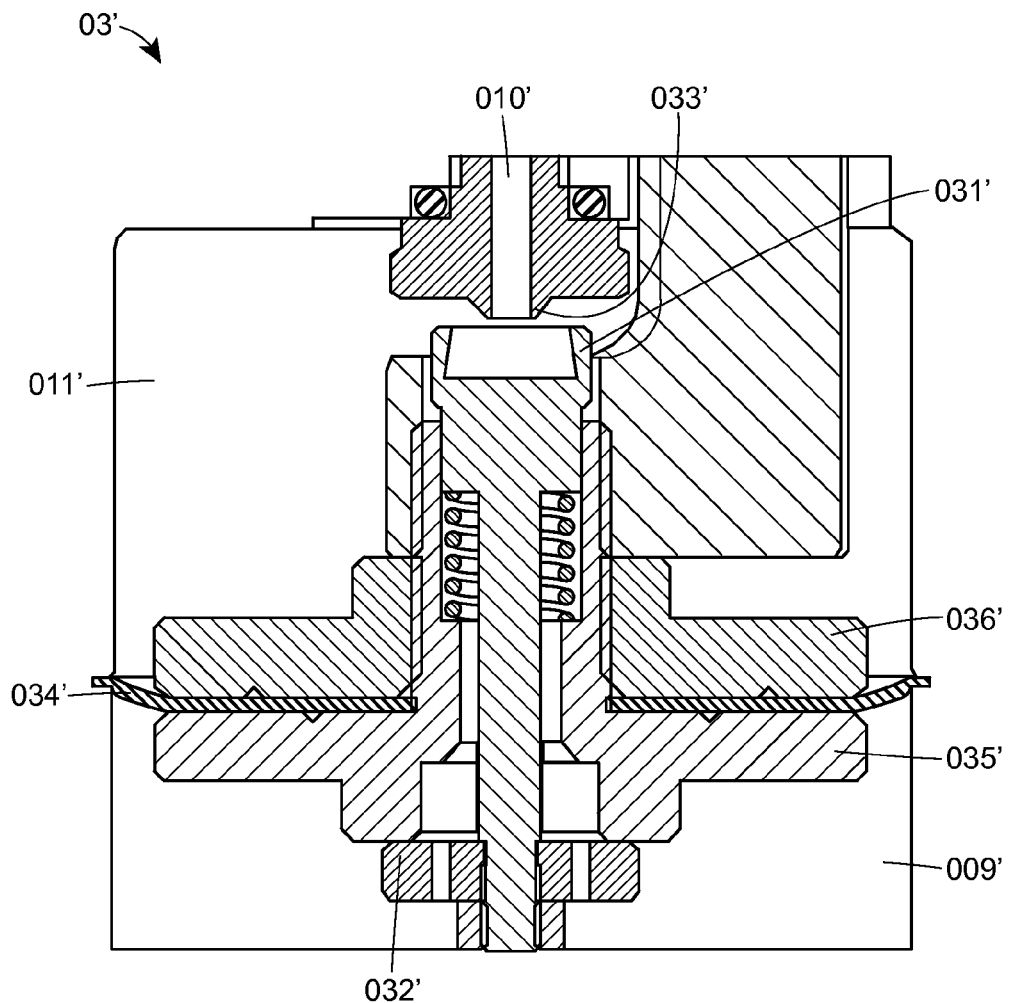
FIG. 2b is a partial sectional view of another known directing valve.

The following will describe the preferable embodiments with reference to the drawings which constitute one part of the present invention. The attached drawings illustrate the specific embodiments for achieving the present invention by way of example. The illustrated embodiments are not intended to limit all of the embodiments of the present invention. It may be appreciated that without departing from the scope of the present invention, other embodiments may be used, or some structural or logical changes may be possible. Therefore, the following specific explanations are not meant as a limitation of the present invention, and the scope of the present invention is defined by the attached claims.

In the following description, the attached drawings are referred to. The drawings constitute a part of the present invention, and some specific embodiments for implementing the present invention are shown by way of example in the drawings. In this regard, some orientation terms, such as "left", "right", "top", "bottom", "front", "back", "guide", "forwards", and "backwards", are used with reference to the directions shown in the drawings. Thus, the members of the embodiments of the present invention may be arranged in different directions, and the orientation terms are used as example rather than limitation. It may be appreciated that without departing from the scope of the present invention, other embodiments may be used, or some structural or logical changes may be possible. Therefore, the following specific explanations are not meant as a limitation of the present invention, and the scope of the present invention is defined by the attached claims.

Figure 3:
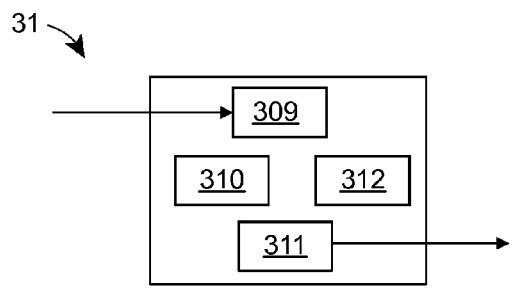
FIG. 3 is a block diagram of one embodiment of the valve assembly according to the present invention.

FIG. 3 shows a block diagram of one embodiment of the valve assembly 31 according to the present invention. As shown in the drawings, the valve assembly 31 comprises a third pressure chamber 309, a second pressure chamber 311, a fourth pressure chamber 310 and an inner chamber 312 of a valve stem. The third pressure chamber 309 may receive the pressure from the external pressure source, and the valve assembly 31 controls the communication and the opening degree between the second pressure chamber 311 and the fourth pressure chamber 310 or the inner chamber 312 of the valve stem in response to the change of the pressure of the third pressure chamber 309, thereby controlling the pressure of the second pressure chamber 311. As shown in FIG. 3, the pressure of the second pressure chamber 311 may be supplied to other elements, equipments or devices.

The following will describe the embodiment of the valve assembly according to the present invention in detail.

Figure 4:
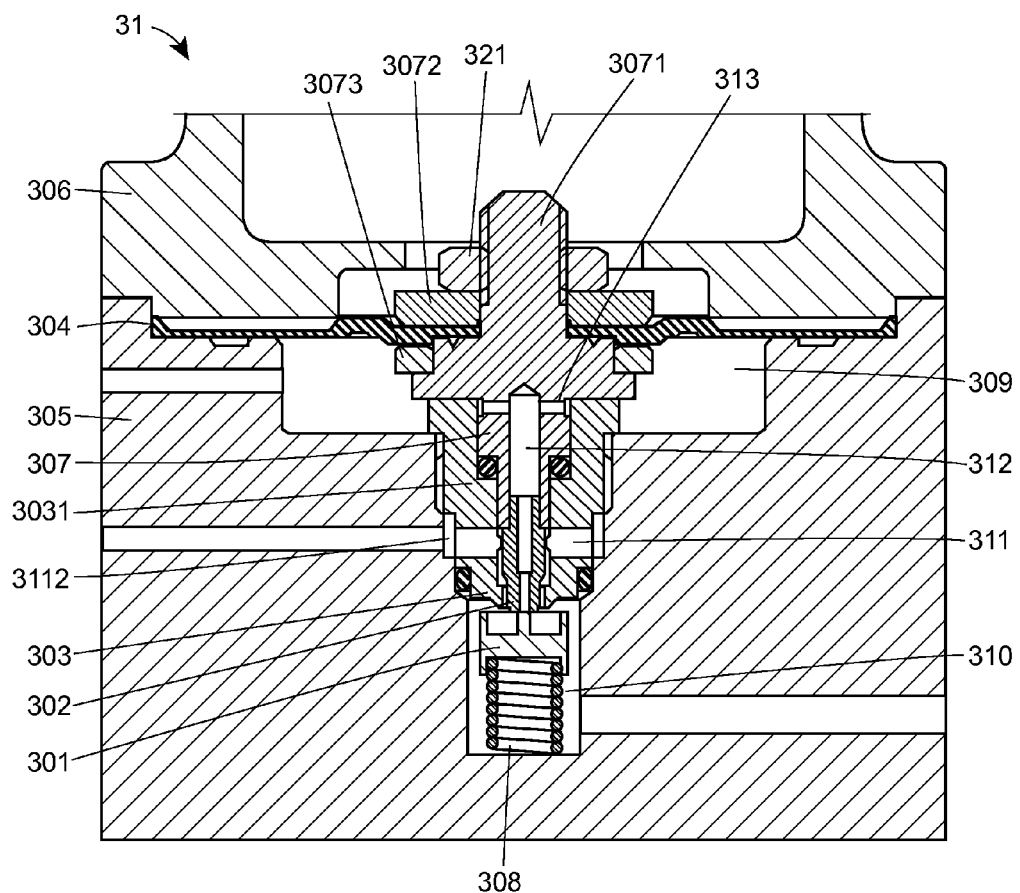
FIG. 4 is a partial sectional view of one embodiment of the valve assembly according to the present invention in the position where the first opening is opened and the connecting hole is closed.

Referring to FIG. 4, it shows a partial sectional view of one embodiment of the valve assembly 31 according to the present invention in the position where the first opening is opened and the connecting hole is closed. The valve assembly 31 comprises a valve body 305, a diaphragm 304, a valve port 303, a valve stem 307 and a blocking device 301 (for example, a valve port gasket).

The valve body 305 defines the third pressure chamber 309, the second pressure chamber 311 and the fourth pressure chamber 310. As shown in the drawings, the third pressure chamber 309, the second pressure chamber 311 and the fourth pressure chamber 310 each has a connecting channel, and the third pressure chamber 309 and the fourth pressure chamber 310 can receive the pressure from different external pressure sources, respectively. The pressure of the second pressure chamber 311 may be supplied to other members, equipments or devices. For example, the second pressure chamber 311 is provided with a side opening 3112 for coupling the second pressure chamber 311 to the external pressure.

Still referring to FIG. 4, the edge of the diaphragm 304 is fixed to the valve body 305 and arranged on one side of the third pressure chamber 309. The diaphragm 304 is movable in response to the change of the pressure of the third pressure chamber 309. In the example of FIG. 4, the edge of the diaphragm 304 is clamped between the valve body 305 and a valve cover 306 fixed to the valve body. It may be appreciated by the person skilled in the art that other fixing forms are also possible.

Still referring to FIG. 4, the valve port 303 is shown to have a lower portion 3030 and an upper portion 3031, which may be in one piece or separated from each other. The valve port 303 is fixed to the valve body 305. The lower portion 3030 of the valve port 303 defines a first opening between the second pressure chamber 311 and the fourth pressure chamber 310.

Still referring to FIG. 4, the valve stem 307 is shown to have a valve stem lower portion 3070 and a valve stem upper portion 3071, which may be in one piece or separated from each other. The valve stem 307 passes through the valve port and is coupled to the diaphragm 304. As shown in the drawings, the valve stem 307 has the inner chamber 312 and is provided with a connecting hole 302 at one end of the valve stem 307. The diaphragm 304 is coupled to the valve stem 307 by a screw nut 321 and an upper plate 3072 and a lower plate 3073, wherein the upper plate 3072 and the lower plate 3073 are arranged on the valve stem upper portion 3071.

Still referring to FIG. 4, the valve port gasket 301 is arranged in the fourth pressure chamber 310 and biased towards the first opening and the connecting hole 302 by a biasing member 308. The biasing member 308 is shown as a spring. It may be appreciated by the person skilled in the art that other elastic members such as corrugate pipe are also possible.

Figure 5:
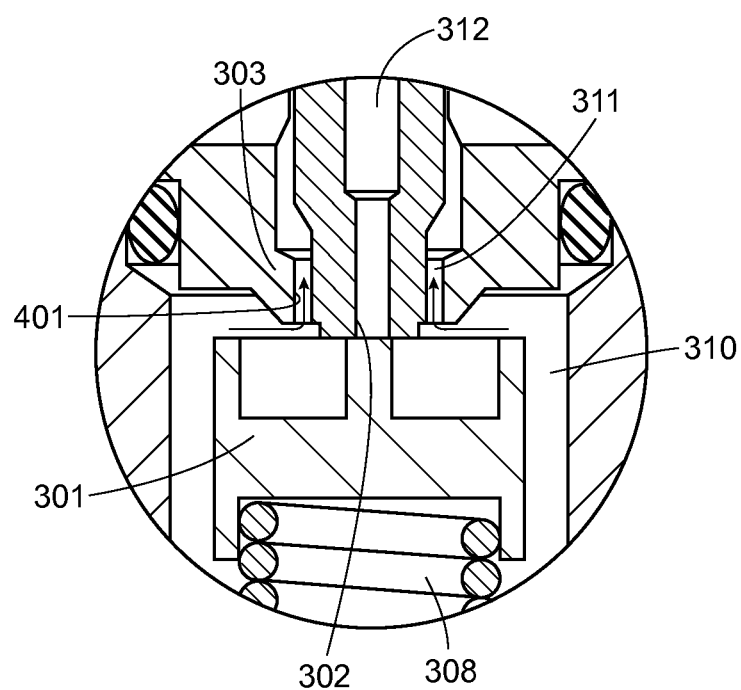
FIG. 5 is a partial enlarged view of the first opening and the connecting hole of FIG. 4.

The following will describe the operation of the exemplary valve assembly 31 with reference to FIGS. 4-7. FIG. 5 shows a partial enlarged view of the embodiment of FIG. 4, wherein the first opening 401 is in an opened position and the connecting hole 302 is in a closed position. As clearly shown in FIG. 5, in this position, the valve port gasket 301 abuts against the valve stem 307 under the biasing action of the spring 308, thus the connecting hole 302 of the inner chamber 312 of the valve stem is closed, while the first opening 401 is opened in this position. In the example shown in FIGS. 4-7, the pressure of the fourth pressure chamber 310 is larger than that of the second pressure chamber 311. Thus, when the first opening 401 is in the opened position, the pressure of the fourth pressure chamber 310 is supplied to the second pressure chamber 311. The speed of the supplying depends on the opening degree of the first opening 401.

The following will explain how the change of the pressure of the third pressure chamber 309 influences the opening degree of the first opening 401.

When the pressure of the third pressure chamber 309 of the valve assembly 31 is decreased, the diaphragm 304 moves downwards under the biasing action of a spring (not shown) arranged in the opposite side of the third pressure chamber 309. Since the valve stem 307 is coupled to the diaphragm 304, the valve stem 307 moves downwards together with the diaphragm 304 so as to push the valve port gasket 301 to move downwards. As a result, the distance between the first opening 401 and the valve port gasket 301 is increased, that is to say, the opening degree of the first opening 401 is increased, thus the pressure of the fourth pressure chamber 310 may be supplied to the second pressure chamber 311 more rapidly, thereby causing the pressure of the second pressure chamber 311 to increase.

On the contrary, when the pressure of the third pressure chamber 309 of the valve assembly 31 is increased, the pressure of the third pressure chamber 309 overcomes the biasing action of the spring (not shown) arranged in the opposite side of the diaphragm 304, thus the diaphragm 304 moves upwards and the valve stem 307 moves upwards together with the diaphragm 304, and the valve port gasket 301 moves upwards by bearing against the valve stem 307 under the biasing action of the biasing spring 308. As a result, the distance between the first opening 401 and the valve port gasket 301 is decreased, that is to say, the opening degree of the first opening 401 is reduced.

The following will describe the opening process of the connecting hole 302.

Figure 6:
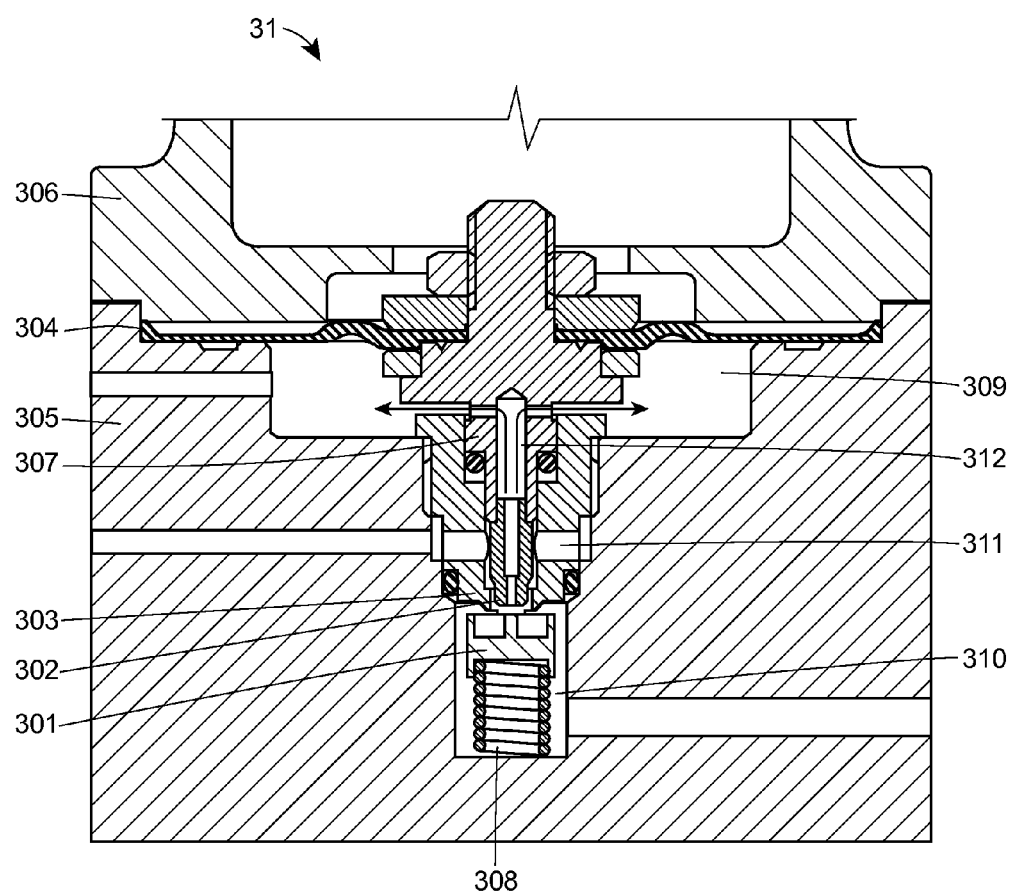
FIG. 6 is a partial sectional view of the embodiment of FIG. 4 in the position where the first opening is closed and the connecting hole is opened.

Referring to FIG. 6, if the pressure of the third pressure chamber 309 of the valve assembly 31 continues to increase, the valve port gasket 301 can not continue to move upwards upon abutting against the lower end surface of the valve port 303. As the pressure of the third pressure chamber 309 continues to increase, the diaphragm 304 overcomes the biasing force of the spring and continues to move upwards, thus the valve stem 307 is forced to move upwards. As a result, the valve stem 307 is disengaged from the valve port gasket 301, that is to say, the connecting hole 302 is opened. In the illustrated examples, the pressure of the inner chamber 312 of the valve stem is lower than that of the second pressure chamber 311, and the inner chamber 312 of the valve stem is in communication with the third pressure chamber 309 via the first channel 313 formed in the valve stem 307. Thus, when the connecting hole 302 is opened, the pressure of the second pressure chamber 311 is quickly discharged to the third pressure chamber 309 via the inner chamber 312 of the valve stem through the connecting hole 302.

Figure 7:
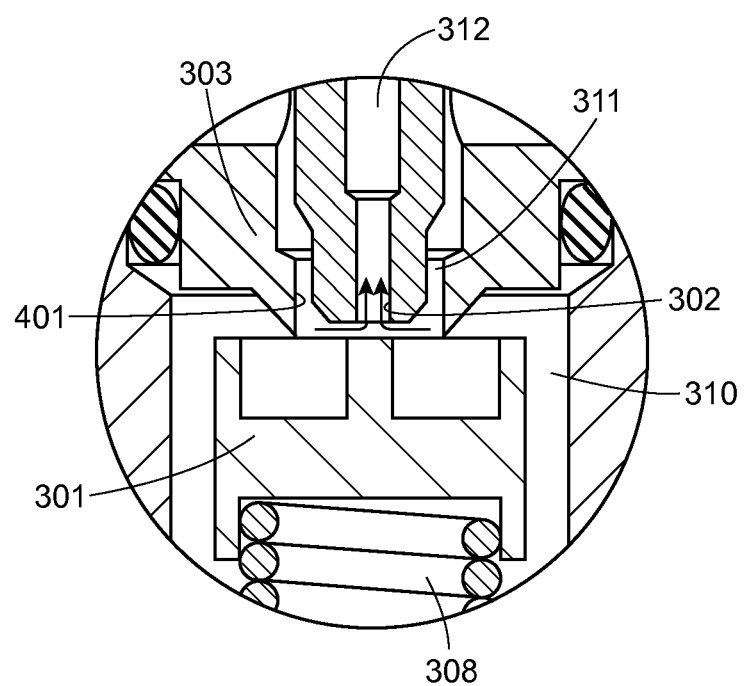
FIG. 7 is a partial enlarged view of the first opening and the connecting hole of FIG. 6.

As more clearly shown in FIG. 7, the discharging direction from the second pressure chamber 311 to the inner chamber 312 of the valve stem is schematically shown by the arrow, and the discharging speed is determined by the opening degree of the connecting hole 302, i.e., the larger the opening degree is, the higher the discharging speed is.

It can be seen from the above description that the valve assembly 31 controls the communication and the opening degree between the second pressure chamber 311 and the fourth pressure chamber 310, the inner chamber 312 of the valve stem in response to the change of the pressure of the third pressure chamber 309, thereby further controlling the pressure change of the second pressure chamber 311.

FIGS. 4-7 illustrate that the inner chamber 312 of the valve stem is in communication with the third pressure chamber 309 via the first channel 313, that is to say, the inner chamber 312 of the valve stem and the third pressure chamber 309 form the first pressure chamber together. It may be appreciated by the person skilled in the art that in other embodiments, the first pressure chamber may only contain the inner chamber 312 of the valve stem.

Figure 8:
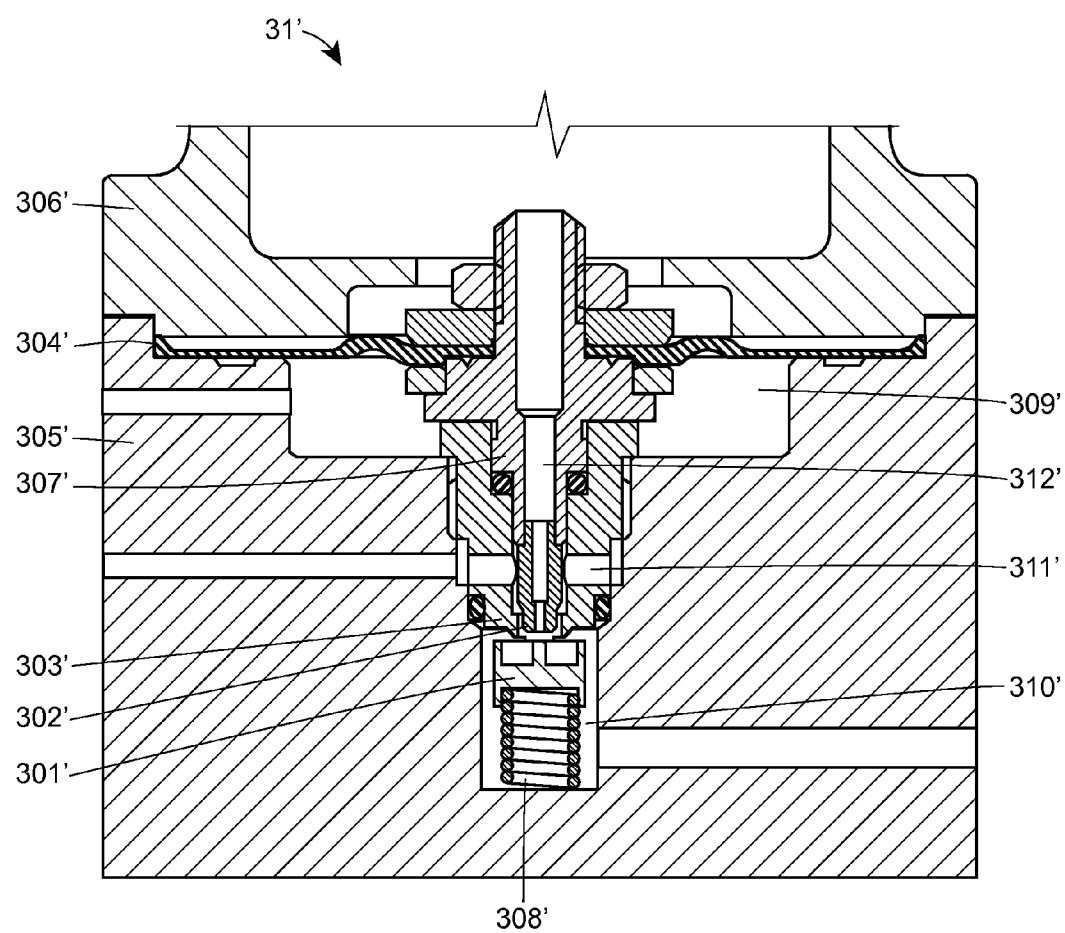
FIG. 8 is a partial sectional view of another embodiment of the valve assembly according to the present invention in the position where the first opening is opened and the connecting hole is closed.
Figure 9:
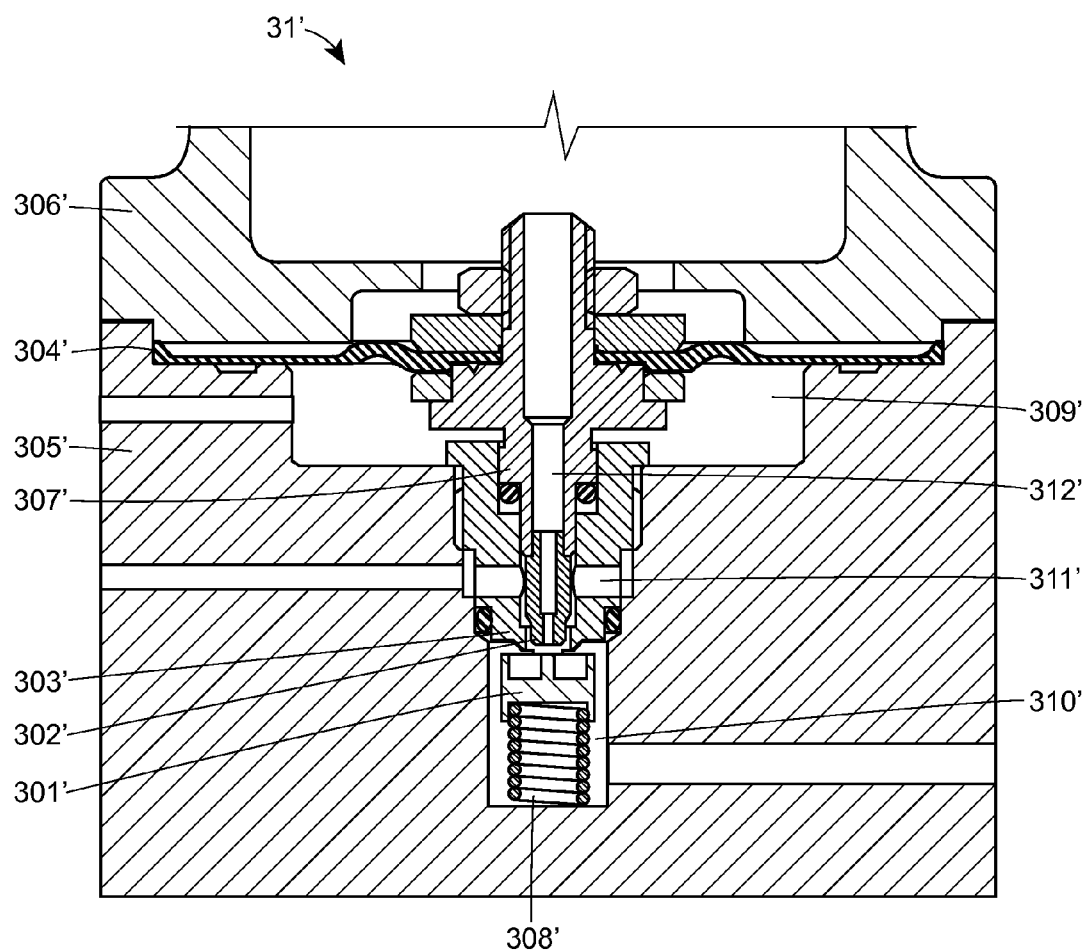
FIG. 9 is a partial sectional view of the embodiment of FIG. 8 in the position where the first opening is closed and the connecting hole is opened.

FIGS. 8-9 illustrate another embodiment of the valve assembly 31' according to the present invention, wherein the inner chamber 312' of the valve stem is in communication with the atmosphere.

Specifically referring to FIG. 8, the valve assembly 31' comprises a valve body 305', a diaphragm 304', a valve port 303', a valve stem 307' and a valve port gasket 301'. The valve body 305' defines a third pressure chamber 309', a second pressure chamber 311' and a fourth pressure chamber 310'.

Referring to FIG. 8, which shows a situation similar to that depicted in FIG. 4, when the pressure of the third pressure chamber 309' of the valve assembly 31' is decreased, the diaphragm 304' moves downwards under the biasing action of a spring (not shown) arranged in the opposite side of the third pressure chamber 309'. Since the valve stem 307' is coupled to the diaphragm 304', the valve stem 307' moves downwards together with the diaphragm 304' so as to push the valve port gasket 301' to move downwards. As a result, the distance between the first opening and the valve port gasket 301' is increased, that is to say, the opening degree of the first opening is increased, thus the pressure of the fourth pressure chamber 310' may be supplied to the second pressure chamber 311' more quickly, thereby causing the pressure of the second pressure chamber 311' to increase.

On the contrary, when the pressure of the third pressure chamber 309' of the valve assembly 31' is increased, the pressure of the third pressure chamber 309' overcomes the biasing action of the spring (not shown) arranged in the opposite side of the diaphragm 304'. Thus, the diaphragm 304' moves upwards, the valve stem 307' moves upwards together with the diaphragm 304', and the valve port gasket 301' moves upward by bearing against the valve stem 307' under the biasing action of the biasing spring 308'. As a result, the distance between the first opening and the valve port gasket 301' is decreased, that is to say, the opening degree of the first opening is decreased.

The following will describe the opening process of the connecting hole 302'.

Referring to FIG. 9, if the pressure of the third pressure chamber 309' of the valve assembly 31' continues to increase, the valve port gasket 301' can not continue to move upwards upon abutting against the lower end surface of the valve port 303'. As the pressure of the third pressure chamber 309' continues to increase, the diaphragm 304' overcomes the biasing force of the spring and continues to move upwards, thus the valve stem 307' is forced to move upwards. As a result, the valve stem 307' is disengaged from the valve port gasket 301', that it to say, the connecting hole 302' is opened. In the illustrated examples, the inner chamber 312' of the valve stem is in communication with the atmosphere. Thus, when the connecting hole 302' is opened, the pressure of the second pressure chamber 311' is quickly discharged to the inner chamber 312' of the valve stem through the connecting hole 302'. The discharging speed is determined by the opening degree of the connecting hole 302', i.e., the larger the opening degree is, the higher the discharging speed is.

FIGS. 4-9 show the embodiments that the pressure of the inner chamber of the valve stem is the pressure of the third pressure chamber or the atmosphere. It should be appreciated by the person skilled in the art that the pressure of the inner chamber of the valve stem may also be any other appropriate pressure.

It should be noted that in the preceding description, the embodiment shows that the pressure of the fourth pressure chamber 310/310' is higher than that of the second pressure chamber 311/311', and the pressure of the second pressure chamber 311/311' is higher than that of the third pressure chamber 309/309', but other arrangements are also possible.

Figure 10:
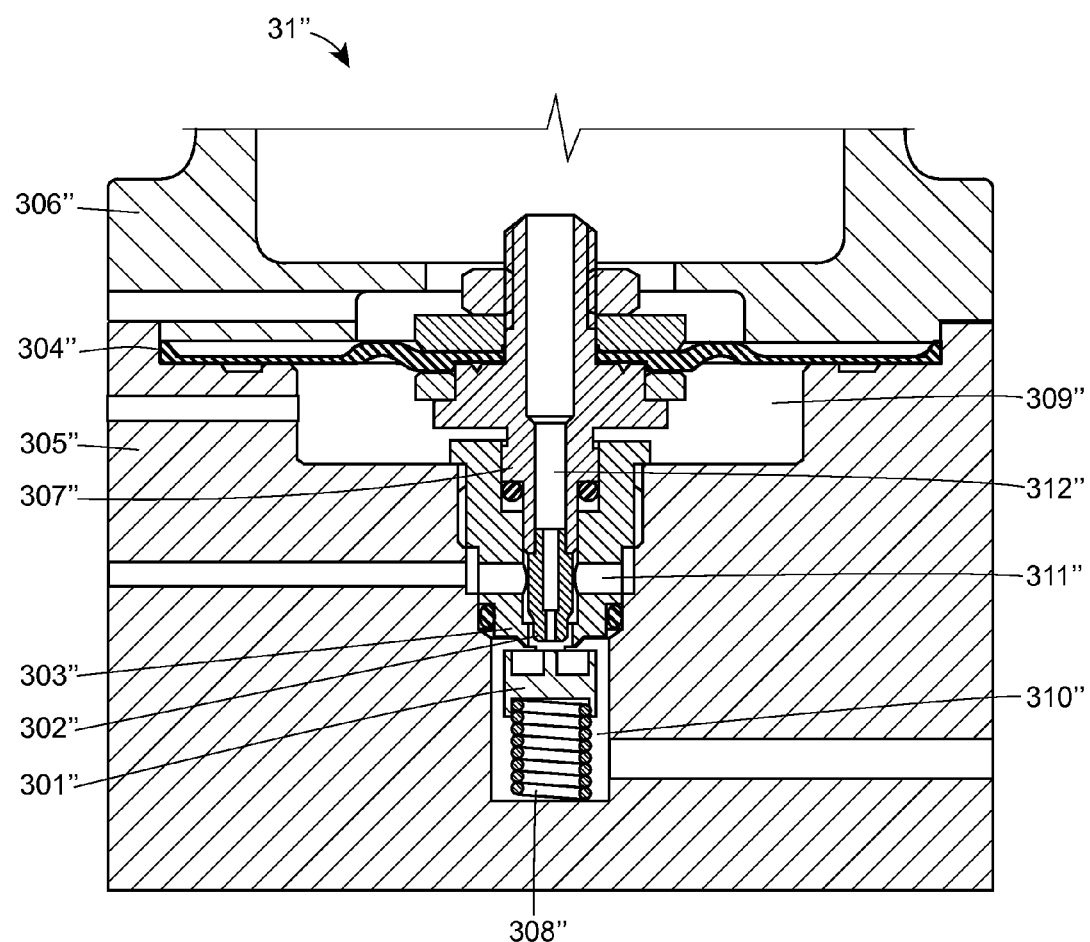
FIG. 10 is a partial sectional view of a further embodiment of the valve assembly according to the present invention in the position where the first opening is closed and the connecting hole is opened.
Figure 11:
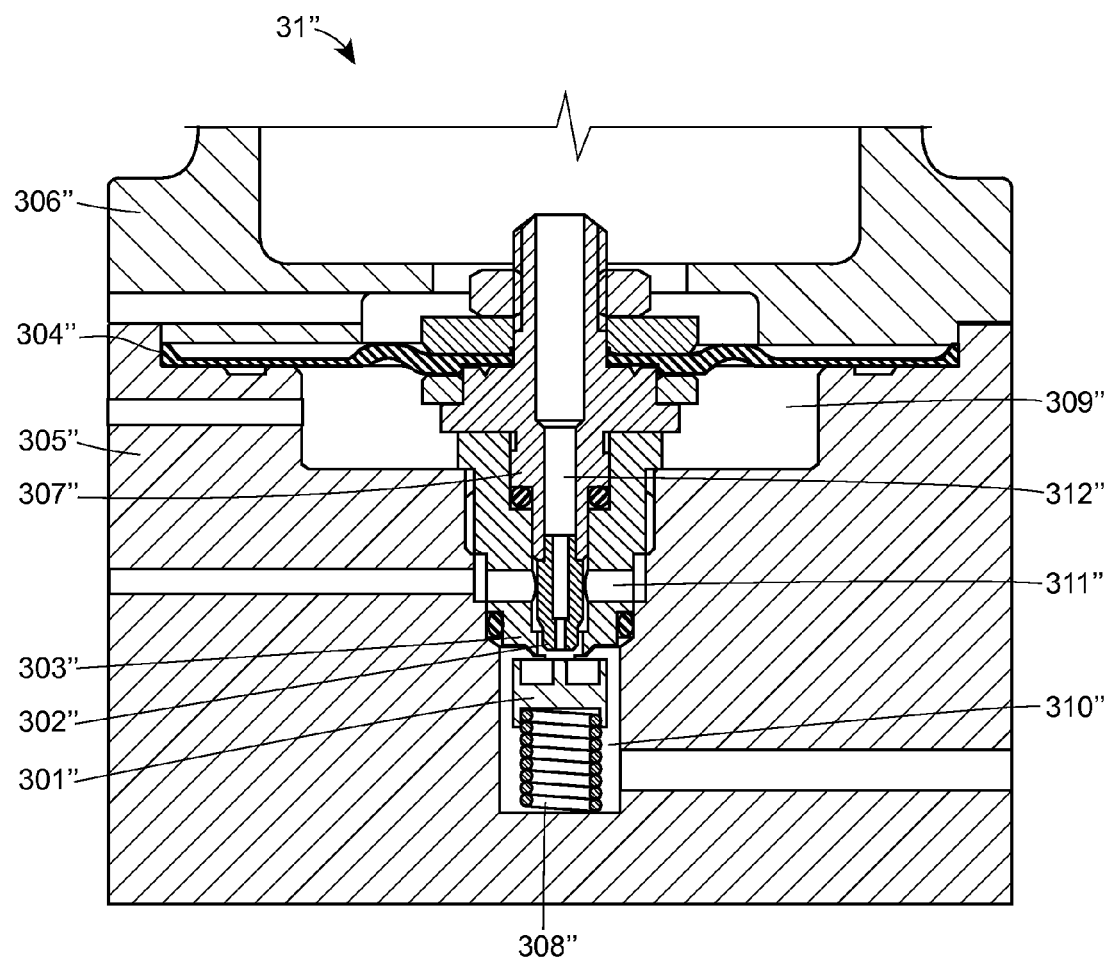
FIG. 11 is a partial sectional view of the embodiment of FIG. 10 in the position where the first opening is opened and the connecting hole is closed.

FIGS. 10-11 illustrate a further embodiment of the valve assembly 31" according to the present invention. In this embodiment, the pressure of the fourth pressure chamber 310" is lower than that of the second pressure chamber 311", and the pressure of the second pressure chamber 311" is lower than that of the third pressure chamber 309".

The valve assembly 31" comprises a valve body 305", a diaphragm 304", a valve port 303", a valve stem 307" and a valve port gasket 301". The valve body 305" defines a third pressure chamber 309", a second pressure chamber 311" and a fourth pressure chamber 310".

As shown in FIG. 10, the third pressure chamber 309" is positioned above the diaphragm 304". When the pressure of the third pressure chamber 309" decreases, the diaphragm 304" moves upwards to force the valve stem 307" to move upwards. The valve port gasket 301" abuts against the valve port 303", that is to say, the first opening is closed, and the lower end surface of the valve stem 307" is disengaged from the valve port gasket 301", that is, the connecting hole 302" is opened. The pressure of the inner chamber 312" of the valve stem is supplied to the second pressure chamber 311" through the connecting hole 302", and the pressure of the second pressure chamber 311" is increased.

If the pressure of the third pressure chamber 309" is increased, the diaphragm 304" moves downwards to force the valve stem 307" to move downwards until the valve stem 307" abuts against the end surface of the valve port gasket 301", and then the connecting hole is closed.

As shown in FIG. 11, if the pressure of the third pressure chamber 309" continues to increase, the valve stem 307" pushes the valve port gasket 301" to move downwards so that the lower end of the valve port 303" is disengaged from the valve port gasket 301", that is to say, the first opening is opened. As a result, the pressure of the second pressure chamber 311" is quickly discharged to the fourth pressure chamber 310" through the first opening.

It can be seen from the above description of the embodiments that the valve assembly of the present invention can obtain one or more following advantages:

Firstly, the connecting hole is arranged adjacent to the first opening, thereby providing more flexibility to the design of the valve assembly.

Secondly, it is unnecessary to couple the valve port gasket to the diaphragm, thereby reducing the complexity of installation.

Additionally, additional members for coupling the valve port gasket to the diaphragm are not needed.

Additionally, the valve port gasket is an independent member, thus it can be replaced simply and the cost is relative lower.

It may be appreciated by the person skilled in the art that the valve assembly of the present invention may be used in any equipment, device or system for adjusting the pressure. The following will describe the embodiment in which the valve assembly of the present invention is used as a directing valve.

Figure 12:
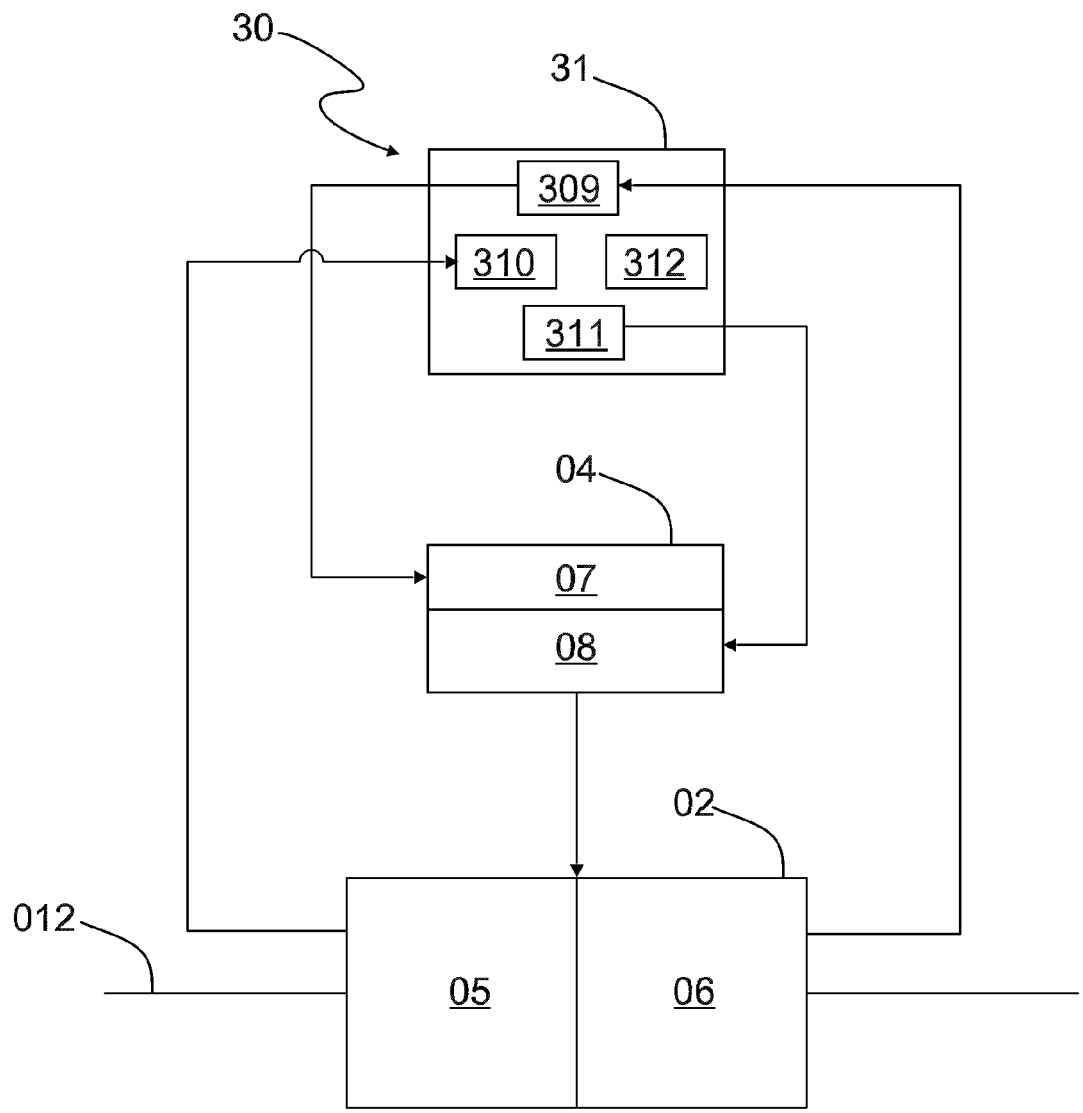
FIG. 12 is a block diagram of one embodiment of the directing valve according to the present invention.

FIG. 12 is a block diagram of one embodiment of the directing valve 30 according to the present invention. As shown in the drawings, the directing valve 30 comprises the valve assembly of the present invention, for example, the valve assembly 31, 31' or 31" as described with reference to FIGS. 4-11. FIG. 12 further illustrates the main valve 02 and the actuator 04 used with the directing valve 30. The main valve 02 has an inlet chamber 05, an outlet chamber 06, a valve port arranged between the inlet chamber 05 and the outlet chamber 06, a valve plug operatively coupled to the valve port and a valve stem coupled to the valve plug. The actuator 04 has an actuating member coupled to the valve stem, a controlling chamber 07 arranged on one side of the actuating member and a controlling chamber 08 arranged on the other side of the actuating member.

In the directing valve 30, the third pressure chamber 309 (/309'/309") of the valve assembly 31 (/31'/31") receives the pressure from the outlet chamber 06 of the main valve 02 and is coupled with the chamber 07 arranged on one side of the actuating member of the actuator 04, and the fourth pressure chamber 310 (/310'/310") of the valve assembly 31 (/31'/31") receives the pressure from the inlet chamber 05 of the main valve 02. The second pressure chamber 311 (/311'/311") of the valve assembly 31 (/31'/31") is coupled with the chamber 08 arranged on the other side of the actuating member of the actuator 04. When the pressure of the outlet chamber 06 of the main valve 02 is changed, the pressure of the third pressure chamber 309 (/309'/309") may be changed accordingly. As described with reference to FIGS. 4-11, the change of the pressure of the third pressure chamber 309 (/309'/309") causes the change in communication and the opening degree between the second pressure chamber 311 (/311'/311"), the fourth pressure chamber 310 (/310'/310"), and the inner chamber 312 (/312'/312") of the valve stem, thereby adjusting the pressure of the second pressure chamber 311 (/311'/311").

Since the third pressure chamber 309 (/309'/309") and the second pressure chamber 311 (/311'/311") are in fluid communication with the chambers 07, 08 of the actuator 04, respectively, the changes of the pressure of the third pressure chamber 309 (/309'/309") and the second pressure chamber 311 (/311'/311") may cause the displacement of the actuating member of the actuator 04 so as to cause the displacement of the valve stem of the main valve 02, thereby causing the opening or closing or the change of the opening degree of the valve port of the main valve 02 so as to adjust the outlet pressure of the main valve 02. The change of the pressure of the outlet pressure may further be fed back to the directing valve 30.

It should be noted that for the purpose of conciseness, the specific structures of the main valve and the actuator are not shown in FIG. 12 and other drawings which show the embodiments of the directing valve in the following description. It may be appreciated that the directing valve of the present invention may be used with any appropriate main valve and/or actuator already known or developed after the filing date of the present invention. Specifically, the main valve 02 may be a piston-type pressure adjusting valve, level-type pressure adjusting valve or any other appropriate pressure adjusting valve already known or developed after the filing date of the present application. The actuator 04 may be a diaphragm-type actuator, piston-type actuator and/or any other appropriate actuator already known or developed after the filing date of the present application.

It should also be noted that the embodiment 30 illustrates that the third pressure chamber 309 is in fluid communication with the chamber 07, and the second pressure chamber 311 is in fluid communication with the chamber 08, but other connections may also be possible. For example, the third pressure chamber 309 can be in fluid communication with the chamber 08 and the second pressure chamber 311 can be in fluid communication with the chamber 07. Moreover, the direction of the valve port and the valve plug of the main valve 02 may be adjusted accordingly.

Figure 13:
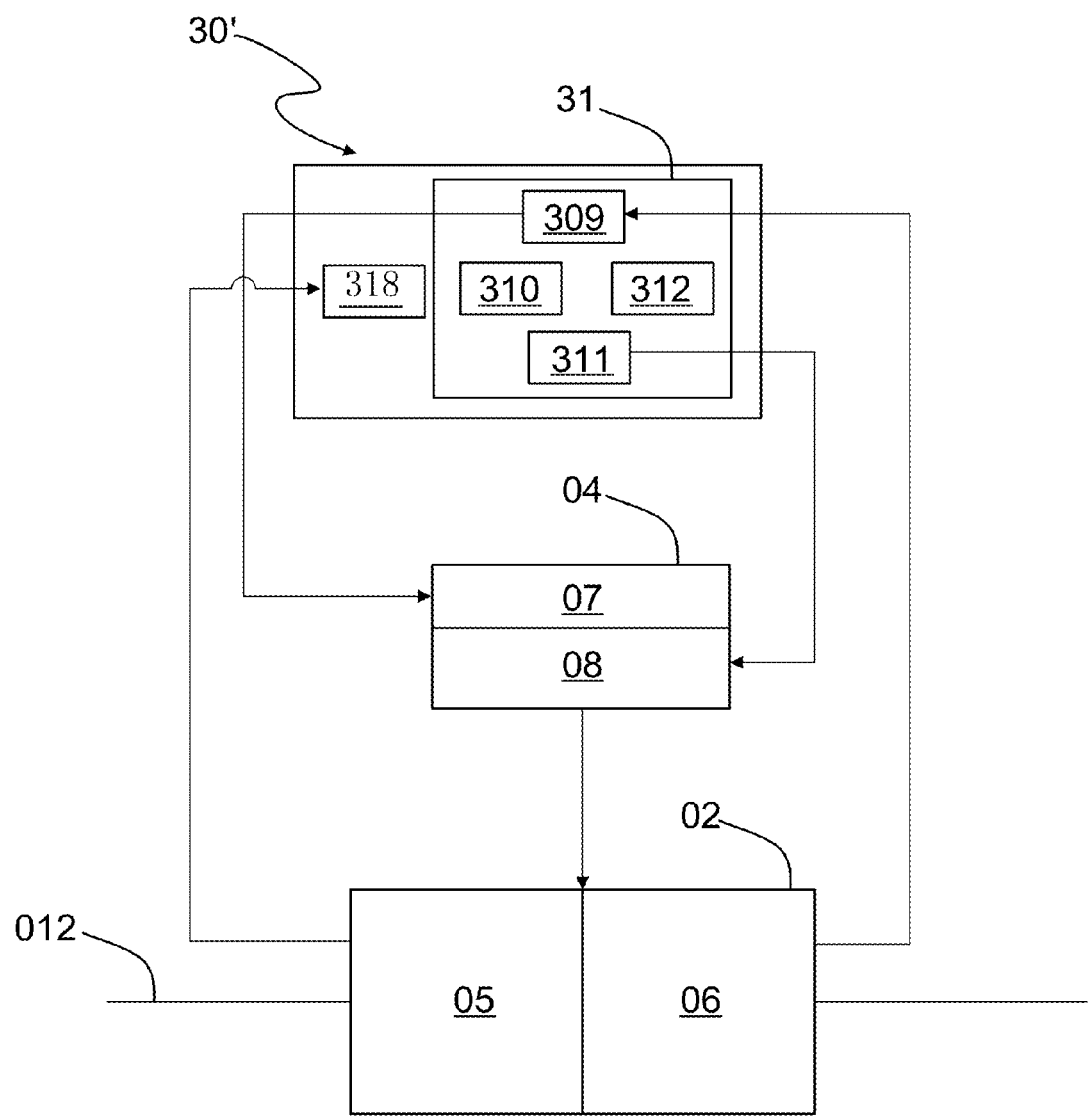
FIG. 13 is a block diagram of another embodiment of the directing valve according to the present invention.

FIG. 13 illustrates the block diagram of another embodiment of the directing valve 30'. As shown in the drawings, the directing valve 30' comprises the valve assembly of the present invention, for example, the valve assembly 31, 31', or 31" described with reference to FIGS. 4-11. The directing valve 30' further comprises a fifth pressure chamber 318.

FIG. 13 further illustrates the main valve 02 and the actuator 04 used with the directing valve 30'. The main valve 02 has an inlet chamber 05, an outlet chamber 06, a valve port arranged between the inlet chamber 05 and outlet chamber 06, a valve plug operatively engaged with the valve port and a valve stem coupled with the valve plug. The actuator 04 has an actuating member coupled with the valve stem, a controlling chamber 07 arranged on one side of the actuating member and a controlling chamber 08 arranged on the other side of the actuating member.

In the directing valve 30', the third pressure chamber 309 (/309'/309") of the valve assembly 31 (/31'/31") receives the pressure from the outlet chamber 06 of the main valve 02 and is coupled with the chamber 07 arranged on one side of the actuating member of the actuator 04, and the fifth pressure chamber 318 of the directing valve 30' receives the pressure from the inlet chamber 05 of the main valve 02. The second pressure chamber 311 (/311'/311") of the valve assembly 31

(/31'/31") is coupled with the chamber 08 arranged on the other side of the actuating member of the actuator 04. When the pressure of the outlet chamber 06 of the main valve 02 is changed, the pressure of the third pressure chamber 309 (/309'/309") may be changed accordingly.

On one hand, the change of the pressure of the third pressure chamber 309 (/309'/309") causes the change in communication and the opening degree between the fifth pressure chamber 318 and the fourth pressure chamber 310 (/310'/310"), thus the pressure of the fourth pressure chamber 310 (/310'/310") is the pressure of the inlet chamber of the main valve by reducing and adjusting the pressure.

On the other hand, as described with reference to FIGS. 4-11, the change of the pressure of the third pressure chamber 309 (/309'/309") causes the change in communication and the opening degree between the second pressure chamber 311 (/311'/311"), the fourth pressure chamber 310 (/310'/310"), and the inner chamber 312 (/312'/312") of the valve stem, thereby adjusting the pressure of the second pressure chamber 311 (/311'/311").

Since the third pressure chamber 309 (/309'/309") and the second pressure chamber 311 (/311'/311") are in fluid communication with the chambers 07, 08 of the actuator 04, respectively, the changes of the pressure of the third pressure chamber 309 (/309'/309") and the second pressure chamber 311 (/311'/311") may cause the displacement of the actuating member of the actuator 04 so as to cause the displacement of the valve stem of the main valve 02, thereby causing the opening or closing or the change of the opening degree of the valve port of the main valve so as to adjust the outlet pressure of the main valve 02. The change of the pressure of the outlet pressure may further be fed back to the directing valve 30.

Figure 14:
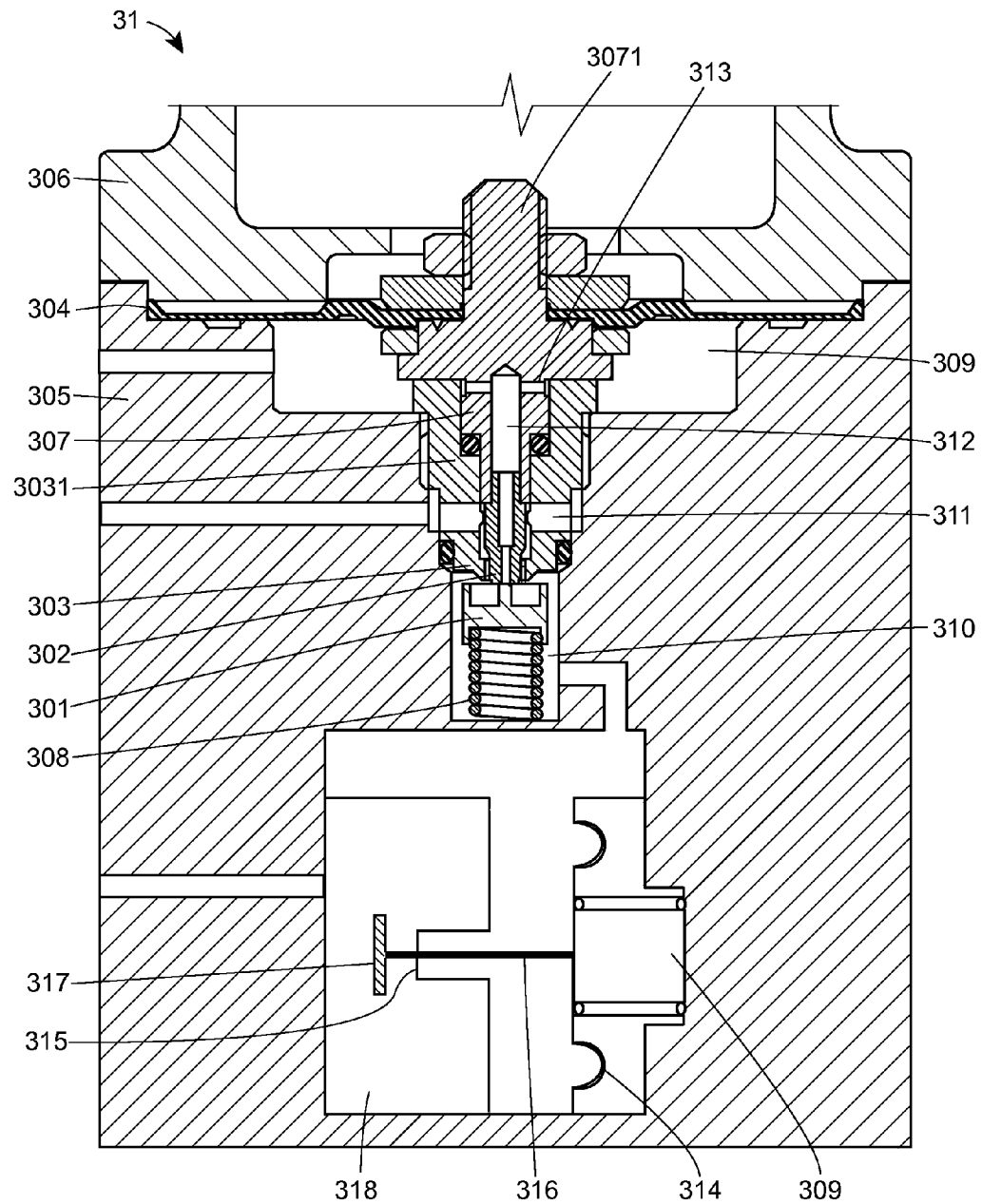
FIG. 14 shows one example of the specific configuration of the directing valve of FIG. 13.

The following will describe the exemplary specific configuration of the directing valve 30' with reference to FIG. 14.

The directing valve 30' comprises: a fifth pressure chamber 318 shown to be arranged in the valve body 305 and in fluid communication with the inlet chamber 05 of the main valve 02; a second diaphragm 314 with the edge thereof fixed to the valve body 305 and arranged on one side of the third pressure chamber 309, the second diaphragm 314 being movable in response to the change of the pressure of the third pressure chamber 309; a second valve port fixed to the valve body 305 and having a third opening 315 arranged between the fifth pressure chamber 318 and a fourth pressure chamber 310; a second valve stem 316 passing through the second valve port and coupled with the second diaphragm 314; and a valve plug 317 coupled with the second valve stem 316 and being movable between a position engaged with the third opening 315 and a position disengaged from the third opening 315. In response to the change of the pressure of the third pressure chamber 309, the second diaphragm 314 forces the second valve stem 316 and the valve plug 317 to move between the position engaged with the third opening 315 and the position disengaged from the third opening 315, thereby adjusting the opening degree of the third opening 315.

It should be noted that the above-described embodiments are given for describing rather than limiting the invention, and it shall be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A valve assembly, comprising:
   a valve body having a first pressure chamber and a second pressure chamber, wherein the pressure of the first pressure chamber is lower than that of the second pressure chamber, and the pressure of the second pressure chamber is discharged to the first pressure chamber in response to the change of the pressure of the first pressure chamber;
   a blocking device movably arranged in the valve body between the first pressure chamber and the second pressure chamber;
   a valve stem arranged in the valve body, one end of the valve stem movably contacting the blocking device; and
   a diaphragm connected to the valve stem and arranged adjacent to or above the first pressure chamber;
   wherein when the pressure of the first pressure chamber changes, the diaphragm forces the valve stem to move by sensing the change of the pressure of the first pressure chamber,
   wherein the first pressure chamber comprises an inner chamber arranged within the valve stem, and the valve stem is provided with a connecting hole at the one end that contacts the blocking device, the connecting hole being for fluidly communicating the inner chamber with the second pressure chamber, and
   wherein the valve assembly further comprises a fourth pressure chamber having a pressure higher than that of the second pressure chamber, and when the valve stem engages the blocking device, the fourth pressure chamber is in fluid communication with the second pressure chamber, and when the valve stem is disengaged from the blocking device, the fourth pressure chamber is shut off from the second pressure chamber.

2. The valve assembly according to claim 1, wherein the fourth pressure chamber is further provided with a biasing member for restoring the blocking device.

3. The valve assembly according to claim 1, wherein the diaphragm is coupled to the valve stem by an upper plate and a lower plate arranged on the valve stem and a screw nut.

4. The valve assembly according to claim 1, further comprising a biasing member disposed in the valve body, the biasing member configured to bias the blocking device toward the valve stem.

5. The valve assembly according to claim 1, wherein the first pressure chamber further comprises a third pressure chamber adjacent to the other end of the valve stem and in fluid communication with the inner chamber of the valve stem, and the diaphragm is arranged above the third pressure chamber and forces the valve stem to move by sensing the change of the pressure of the third pressure chamber.

6. The valve assembly according to claim 5, wherein the diaphragm is coupled to the valve stem by an upper plate and a lower plate arranged on the valve stem and a screw nut.

7. The valve assembly according to claim 1, wherein when the valve stem engages the blocking device, the connecting hole is blocked by the blocking device and the first pressure chamber is shut off from the second pressure chamber, and when the valve stem is disengaged from the blocking device, the first pressure chamber is in fluid communication with the second pressure chamber through the connecting hole.

8. The valve assembly according to claim 7, wherein the diaphragm is coupled to the valve stem by an upper plate and a lower plate arranged on the valve stem and a screw nut.

9. The valve assembly of claim 7, further comprising an opening defined between the valve stem and the valve port, the opening being for fluidly coupling the second pressure chamber with the fourth pressure chamber, wherein when the valve stem engages the blocking device, the opening is exposed, such that the second pressure chamber is in fluid communication with the fourth pressure chamber through the opening, and wherein when the valve stem is disengaged from the blocking device, the blocking device contacts the valve port, thereby closing the opening, such that the second pressure chamber is shut off from the fourth pressure chamber.

10. The valve assembly according to claim 7, wherein the valve body is further provided with a valve port for receiving the valve stem, and the second pressure chamber is arranged on the valve port and has a side opening for coupling the second pressure chamber to an external pressure source.

11. The valve assembly according to claim 10, wherein the diaphragm is coupled to the valve stem by an upper plate and a lower plate arranged on the valve stem and a screw nut.

12. A valve assembly, comprising:
- a valve body having a first pressure chamber and a second pressure chamber, wherein the pressure of the first pressure chamber is lower than that of the second pressure chamber, and the pressure of the second pressure chamber is discharged to the first pressure chamber in response to the change of the pressure of the first pressure chamber;
- a blocking device movably arranged in the valve body between the first pressure chamber and the second pressure chamber;
- a valve stem arranged in the valve body, one end of the valve stem movably contacting the blocking device; and
- a diaphragm connected to the valve stem and arranged adjacent to or above the first pressure chamber;
- wherein when the pressure of the first pressure chamber changes, the diaphragm forces the valve stem to move by sensing the change of the pressure of the first pressure chamber,
- wherein the first pressure chamber comprises an inner chamber arranged within the valve stem, and the valve stem is provided with a connecting hole at the one end that contacts the blocking device, the connecting hole being for fluidly communicating the inner chamber with the second pressure chamber, and
- wherein when the valve stem engages the blocking device, the first pressure chamber is in fluid communication with the second pressure chamber, and when the valve stem is disengaged from the blocking device, the first pressure chamber is shut off from the second pressure chamber.

13. The valve assembly according to claim 12, wherein the diaphragm is coupled to the valve stem by an upper plate and a lower plate arranged on the valve stem and a screw nut.

\* \* \* \* \*